United States Patent [19]

Yuen et al.

[11] 4,395,740
[45] Jul. 26, 1983

[54] APPARATUS AND METHOD FOR LOCATING AND PRESENTING PRE-RECORDED INFORMATION

[76] Inventors: Aubrey Yuen, 5682 Oak Dr., La Palma, Calif. 90623; William P. Battista, 3 Rollingwood Dr., Rolling Hills Estate, both of Calif. 90274

[21] Appl. No.: 166,449

[22] Filed: Jul. 7, 1980

[51] Int. Cl.³ .................. G11B 15/18; G11B 17/00
[52] U.S. Cl. .................. 360/72.2; 360/33.1; 360/134; 360/64
[58] Field of Search ............ 360/72.2, 72.1, 72.3, 360/63, 64, 74.4, 47, 131–132, 134, 33

[56] References Cited

U.S. PATENT DOCUMENTS

| | | | |
|---|---|---|---|
| 2,614,169 | 10/1952 | Cohen | 360/63 X |
| 2,680,239 | 6/1954 | Daniels et al. | 360/63 |
| 3,736,565 | 5/1973 | Sidline | 360/72.2 |
| 4,210,785 | 7/1980 | Huber et al. | 360/72.2 X |
| 4,301,482 | 11/1981 | Trevithick | 360/72.2 |

FOREIGN PATENT DOCUMENTS

| | | | |
|---|---|---|---|
| 54-2708 | 10/1979 | Japan | 360/72.2 |
| 2047432 | 11/1980 | United Kingdom | 360/72.2 |

Primary Examiner—John H. Wolff
Attorney, Agent, or Firm—Robert J. Schaap

[57] ABSTRACT

An apparatus and a method for locating and presenting pre-recorded information, and more particularly, locating and presenting any of a plurality of messages which are recorded on video medium such as video disc or video tape. In one aspect, the apparatus may adopt the form of an informational display system which provides information regarding consumer products or services. The apparatus includes an imput mechanism such as a plurality of manually operable imput switches, a video display screen and a controller, which controls a video tape unit in the apparatus for locating and presenting a selected message. In another aspect, the apparatus is designed to locate any of a plurality of messages pre-recorded on tape, such as video tape, in a relatively short search time. In this embodiment, the apparatus comprises a plurality of tape units including at least a first tape unit and a second tape unit. A separate tape is used for each tape unit, and essentially the same messages are recorded on each tape. A controller in the apparatus assigns to the first tape unit a first group of the messages which are to be located and presented and a second group of the messages which are to be located and presented to thereby reduce the amount of search time. Further, an initial start position is located intermediate and preferably midway between the first and last messages in each group assigned to each tape unit. When a selection is made, the tape unit having that selection in the assigned group will move the tape either to the right or left from the start position to the selected message. In this way, it is only necessary to move the tape a relatively short distance to the selected message.

57 Claims, 9 Drawing Figures

APPARATUS AND METHOD FOR LOCATING AND PRESENTING PRE-RECORDED INFORMATION

BACKGROUND OF THE INVENTION

1. Field of the Invention

This invention relates in general to certain new and useful improvements in information locating and presentation systems and in particular, to an information locating and presenting system which operates so that one of a large number of separate messages can be selected and located from a pre-recorded medium in a minimum amount of search time and thereafter presented.

2. A Brief Description of the Prior Art

There are various video display systems available for promotional and informational purposes. A typical system frequently seen in department stores consists of a continuous loop of film having images of the film constantly projected on a screen. A similar system is frequently used in museums with the additional feature that the projector automaticlly stops showing the message or other presentation at the end of the film. Since the film is in a continuous loop with the same or similar messages recorded sequentially on the film several times the observer merely presses a start button to commence the projection of the same message another time.

Continuous loop sound tapes have been known for quite some time. Systems incorporating the tape loops range from eight-track cartridge players to telephone answering machines. Both the tape and film continuous loop systems are useful for presenting a single program. However, it is impractical to incorporate multiple programs onto the continuous loop since the system must run all of the programs before it returns to any of the previously run programs. This inconvenience has been experienced by anyone having an eight-track tape who desires to hear a particular selection at the end of the tape. Thus with thirty thirty-second programs on a continuous loop system the viewer would have to wait up to fifteen minutes before seeing or hearing a desired selection.

These difficulties emphasize the desirability of providing a random access capability in a system for displaying a plurality of programs. An example of such a system is the juke box apparatus wherein by inputing the appropriate code a listener can access any of the plurality of records contained in the apparatus.

OBJECTS OF THE INVENTION

It is, therefore, one of the primary objects of the present invention to provide an informational display system which is capable of presenting a selected one from a plurality of messages regarding consumer products or services with a video display along with an audio presentation regarding the selected product or service.

It is another object of the present invention to provide a system which is capable of locating one of a plurality of messages pre-recorded on a tape medium in a relatively quick search time and thereafter presenting such message by using a plurality of tape mediums with each containing substantially the same messages and assigning only certain of the messages to be presented from any one of the tape mediums.

It is a further object of the present invention to record an intial start position intermediate the first and last messages in a group of messages on a tape medium and locating the intitial start position at a reading head so that movement only to the right or to the left of the reading head may take place for locating a selected message in a relatively short time frame.

It is yet another object of the present invention to provide a method of addressably encoding a plurality of messages on a video tape for later selection and by recording address codes for each messages in an address code location on the tape and thereafter introducing these address codes into a storage member associated with a tape unit which is to present any of the messages on the tape.

It is another salient object of the present invention to provide a method for locating and presenting messages on a tape medium by providing a plurality of tapes, with each having substantially the same messages thereon, assigning only certain messages to be presented by each tape, introducing each of the tapes on a separate tape playing unit, and thereafter using a controller to operate any of the selected one of the tape units in accordance with a message selected for presentation.

It is still another object of the present invention to provide a method of the type stated in which a controller can alter the groups of messages played on any particular tape unit in order to reduce the wear of the messages.

With the above and other objects in view, our invention resides in the novel features of form, construction, arrangement, and combination of parts presently described and pointed out in the claims.

BRIEF SUMMARY OF THE DISCLOSURE

The information selection and presentation system disclosed herein is designed to contain a plurality of separate messages, often referred to as "programs", with each of varying time duration. These messages may be, for example, advertisement for hotels, night clubs, or tourist attractions. Further, the messages may be advertisements or information on consumer products or the like. The term "message" is used in a broad or generic sense to mean not only verbal or written word presentation, but may include musical presentation non-sound and only video presentation or various combinations thereof.

The system in one embodiment may be designed to visually display a promotional message known as a "grabber" or "tease" to attract a passer's-by attention. Upon approaching the system the individual sees a panel containing pictures and/or written descriptions of the various programs contained in the system. The system may include a directory and associated with each of these promotional messages is an input code which the individual may key into the system to access the desired message.

While searching for the desired message the system displays a program known as a "filler" to keep the individual's attention until the selected program is accessed. Once the desired message is accessed, it is displayed on a visually preceptible medium such as a T.V. monitor. Sound means is included in the system to enable a sound track to be included with the program.

The system is also designed to contain a matrix of illuminating elements underneath an overlay as, for instance, a diagrammatic overlay. The overlay could depict, for instance, a section of a city. Alternatively if the programs pertain to different stores in a shopping plaza the overlay could be a map of the shopping plaza. In a similar manner the overlay could be a diagram of a human body. Such an overlay would be desirable if the messages related to, for example, the functions of various parts of the body.

Upon activation of a message or program the apropriate illuminating element under the overlay flashes or is energized to indicate to the viewer to which portion of the map or diagram the program relate. For example the flashing light could indicate the location of a hotel or the location of a particular gear in a machine.

The information selection and presentation system is designed to use a plurality of audio-video units, as for example, video tape decks, in order to reduce the search time required to access the selected message. All of the units contain substantially the same pre-recorded messages and typically identical pre-recorded messages; yet each unit is assigned to present only a certain group of the messages and which group contains less than the total number of messages on a tape.

The tape, as described herein, is only one form of record or record medium which may be used in the present invention. The record could comprise any medium of storing information that can be translated into visual and audio impressions, as for instance, a video tape. However, the present invention is highly effective with tapes such as video tapes. Hence, if the system contained three video tape decks A, B and C, respectively, deck A could be assigned to present messages on the first third of the video tape, deck B to the second third, and deck C to the final third. This, of course, reduces the worst case search time by a factor of three.

Each unit is programed to return its tape to the center portion of the group assigned to that unit and which center portion constitutes the intial start position. For instance, in the example given above, deck A would wind or rewind the tape until the tape was one-sixth from the beginning. In this way the worst case search entails a wind of only one-sixth of the tape instead of one-third.

The information selection and presentation system contains a separate unit with a promotional record for attracting the attention of passers-by.

A key board input allows the introduction by the user of a sequence of numeric or alpha-numeric characters comprising an input code to identify a particular message on the system. The input code addresses the memory of the controller that contains the record location of the selected message. Stored with the location is the identification of the particular illuminating element associated with the selected message.

The controller keeps track of the number of times that each message or program has been selected. At the end of a pre-determined period of time, e.g. the end of a one day period, as indicated by a timer, the controller reassigns the segments of the tape to the tape playing units according to that day's usage. This equalizes the wear among the units and among the tapes, thereby extending their life. For instance, in the previous example, if deck A had the highest amount of playing time for the day followed by decks B and C, deck A would be assigned that segment of the tape that had been assigned to deck C. In a similar manner deck B would be assigned to that segment of the tape that deck A had been responsible for. Deck C would be assigned that segment of the tape previously assigned to deck B.

The system also includes a printer that prints out the identification codes associated with each program, the number of times each program has been played, and the operational mode of each tape unit, as well as some identification as to the location of the system which uses such tape. It should be understood that the controller could be designed to cause the printer to print-out related information as well.

The controller can sense the failure of a unit and effectively remove that unit from the system. One of the other units is then required to handle the failed unit's segment of the record as well as its own.

This invention possesses many other advantages and has other purposes which may be made more clearly apparent from a consideration of the forms in which it may be embodied. These forms are shown in the drawings forming and accompanying part of the present specification. They will now be described in detail for the purposes of illustrating the general principals of the invention, but it is to be understood that such detailed descriptions are not to be taken in a limiting sense.

BRIEF DESCRIPTION OF THE DRAWINGS

Figure 2:
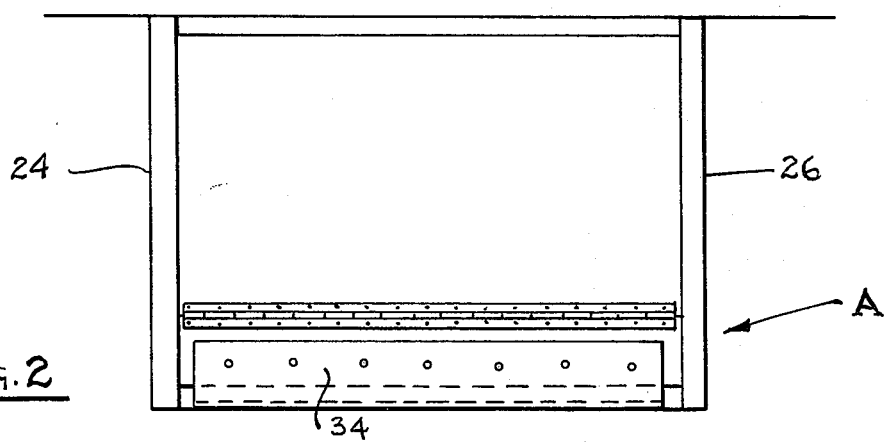
Figure 1:
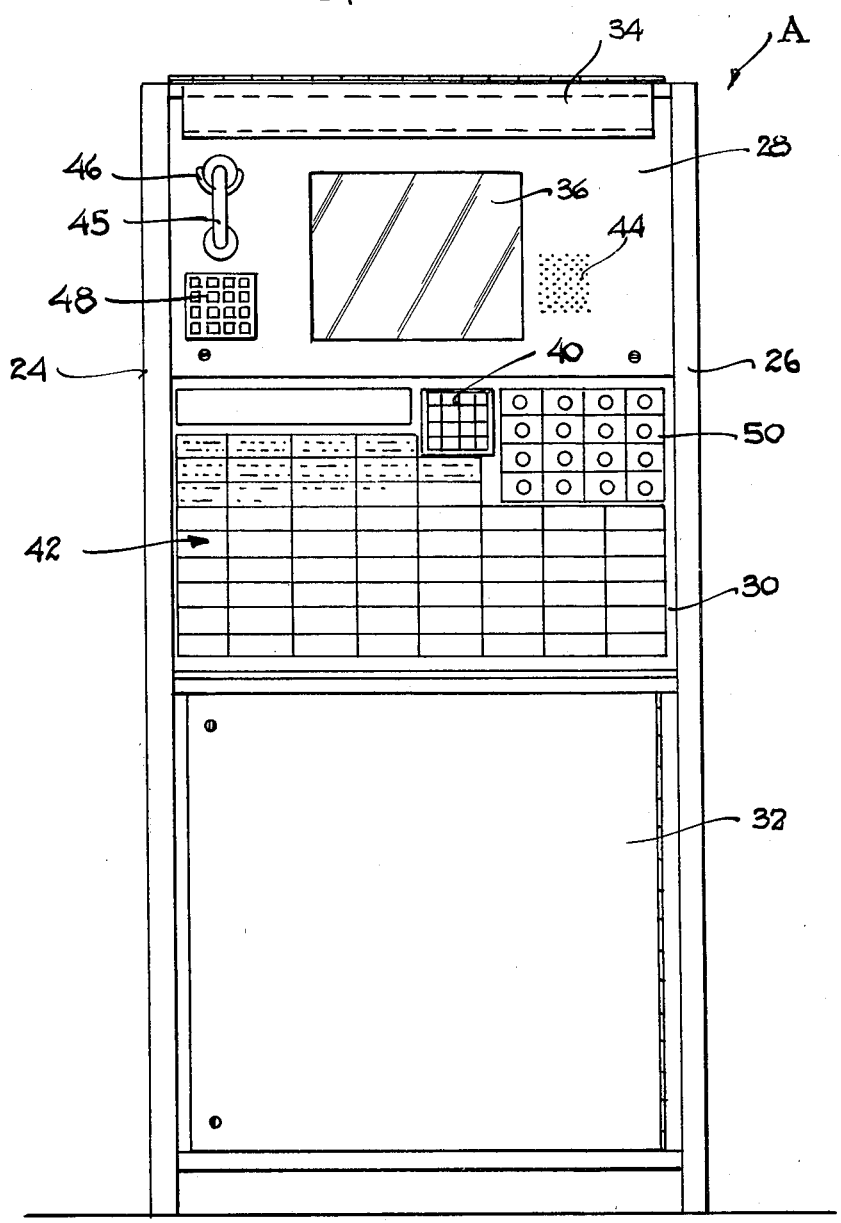
Figure 3:
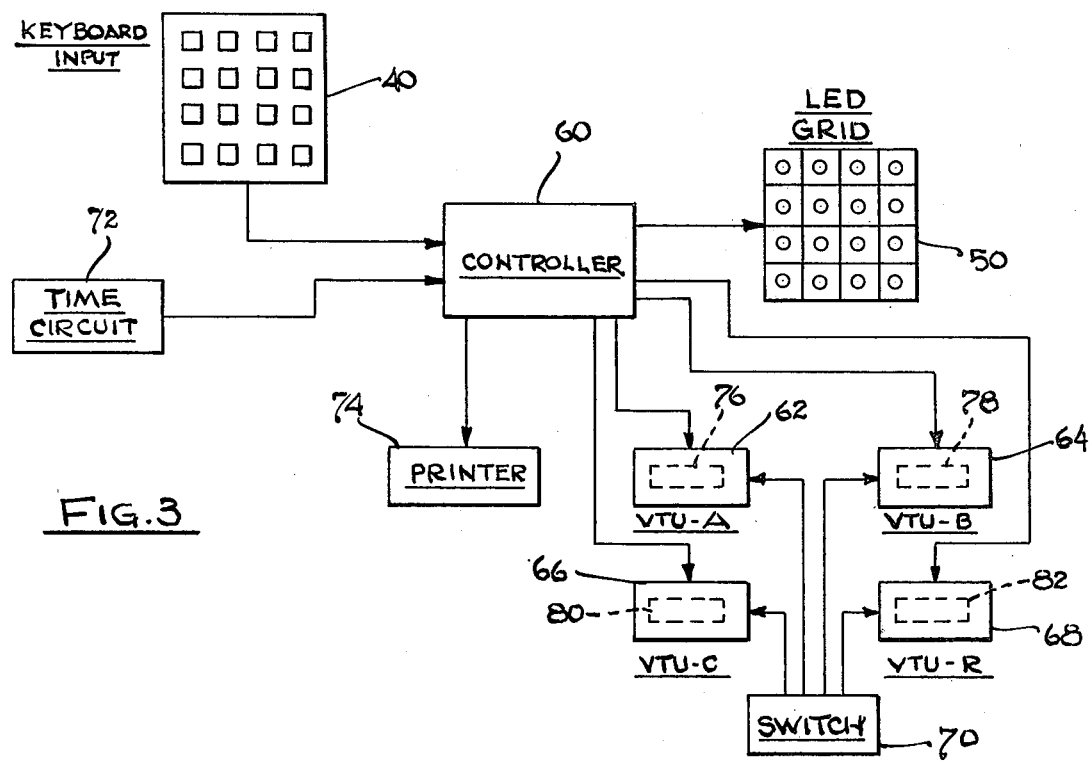
Figure 4:
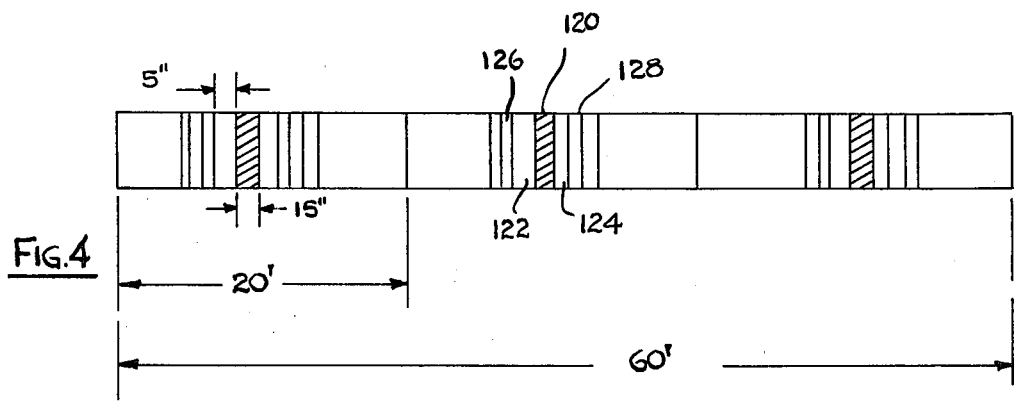
Figure 6:
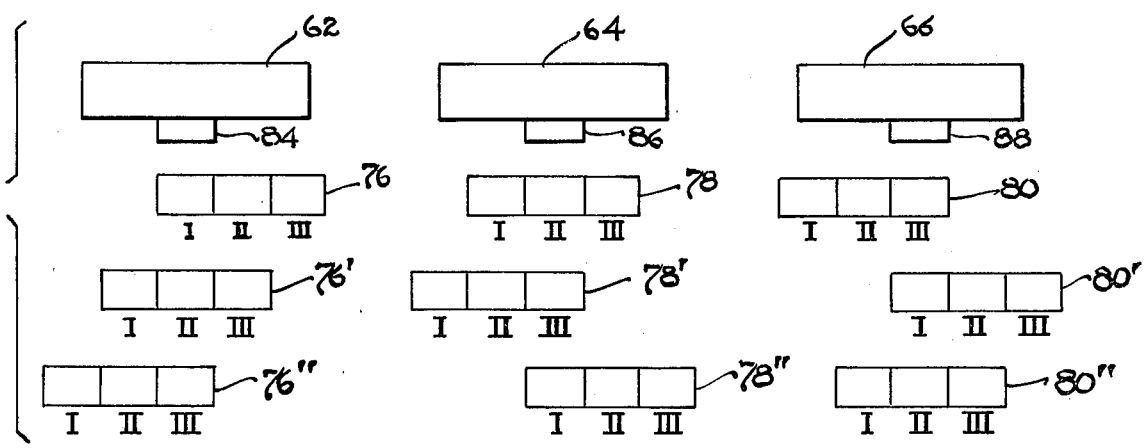
Figure 5:
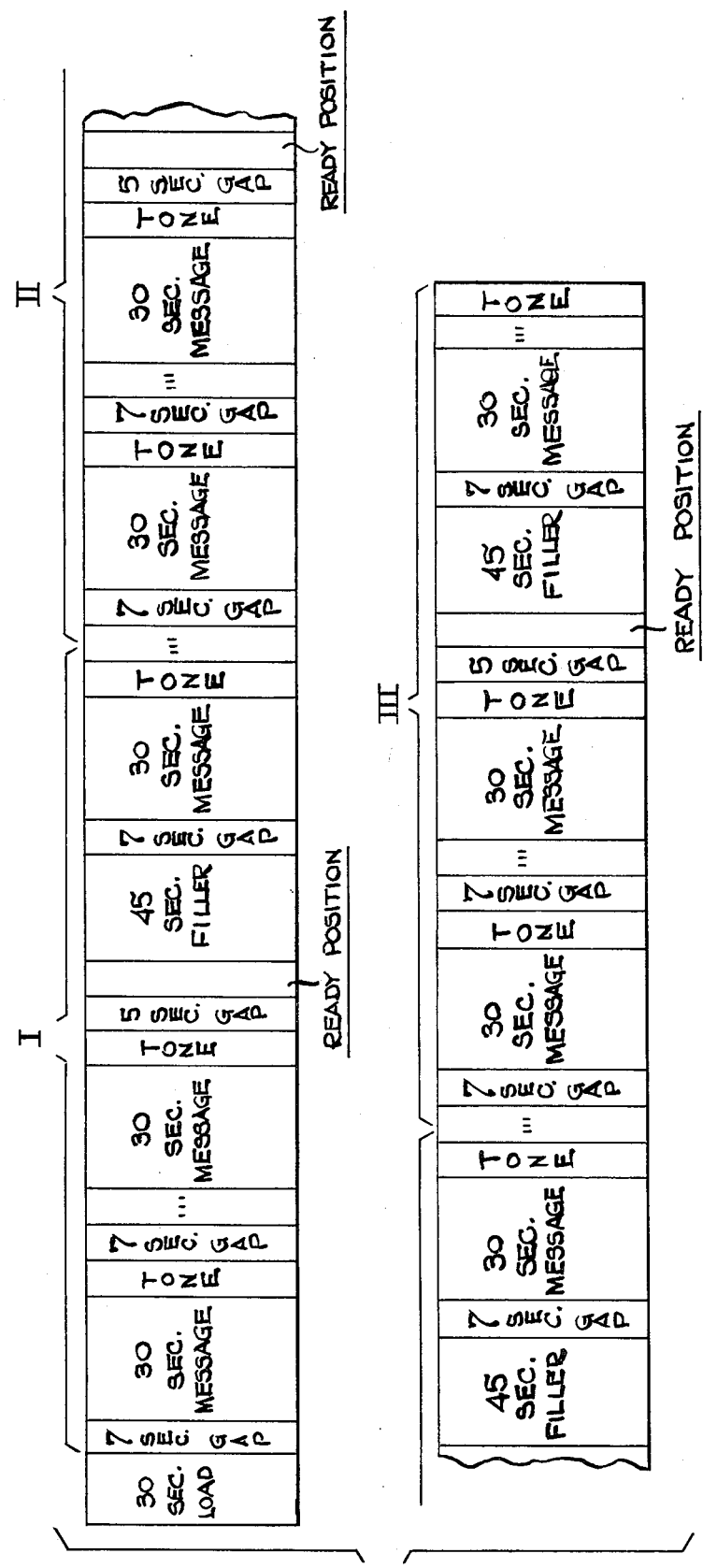
Figure 7:
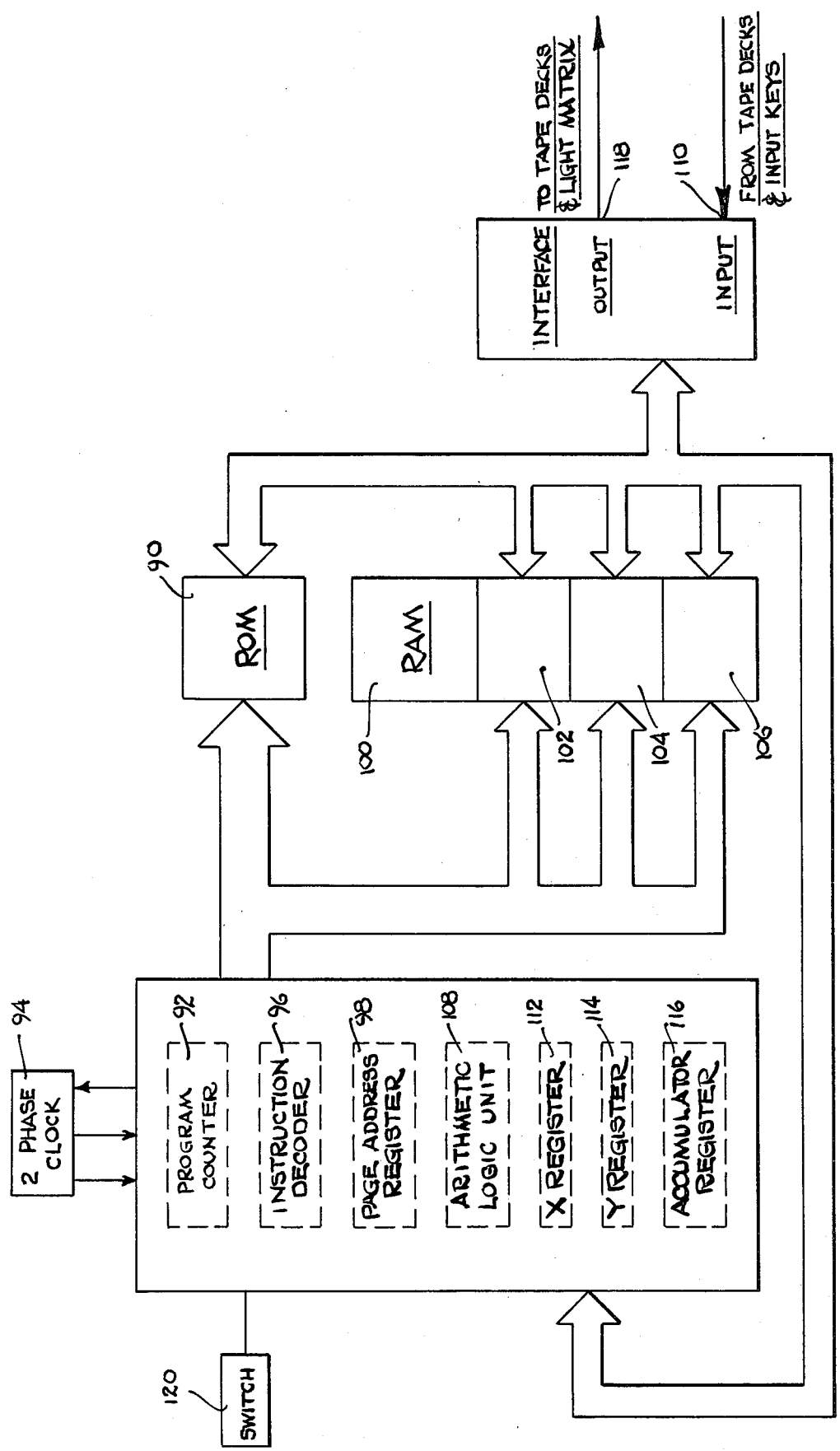
Figure 8:
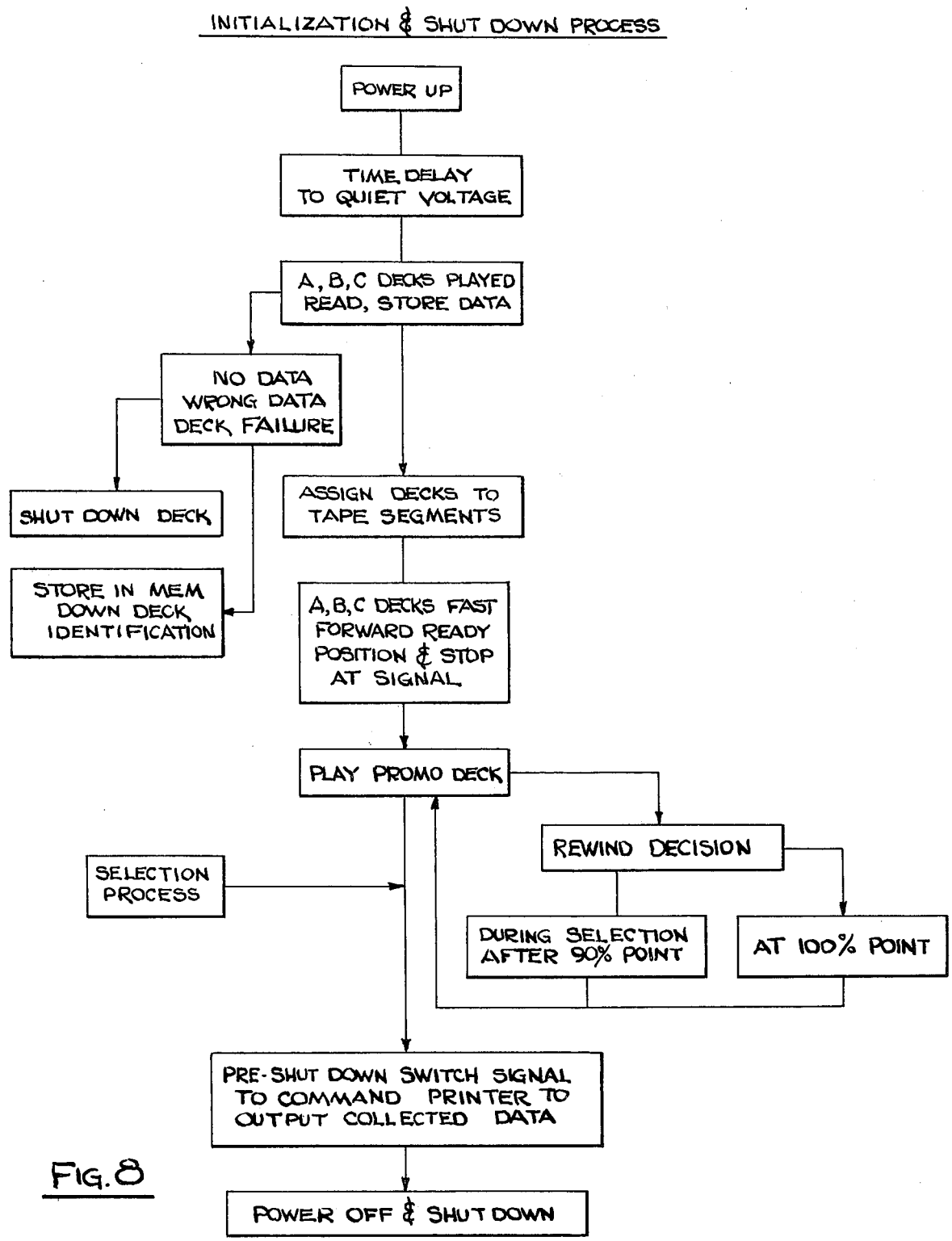
Figure 9:
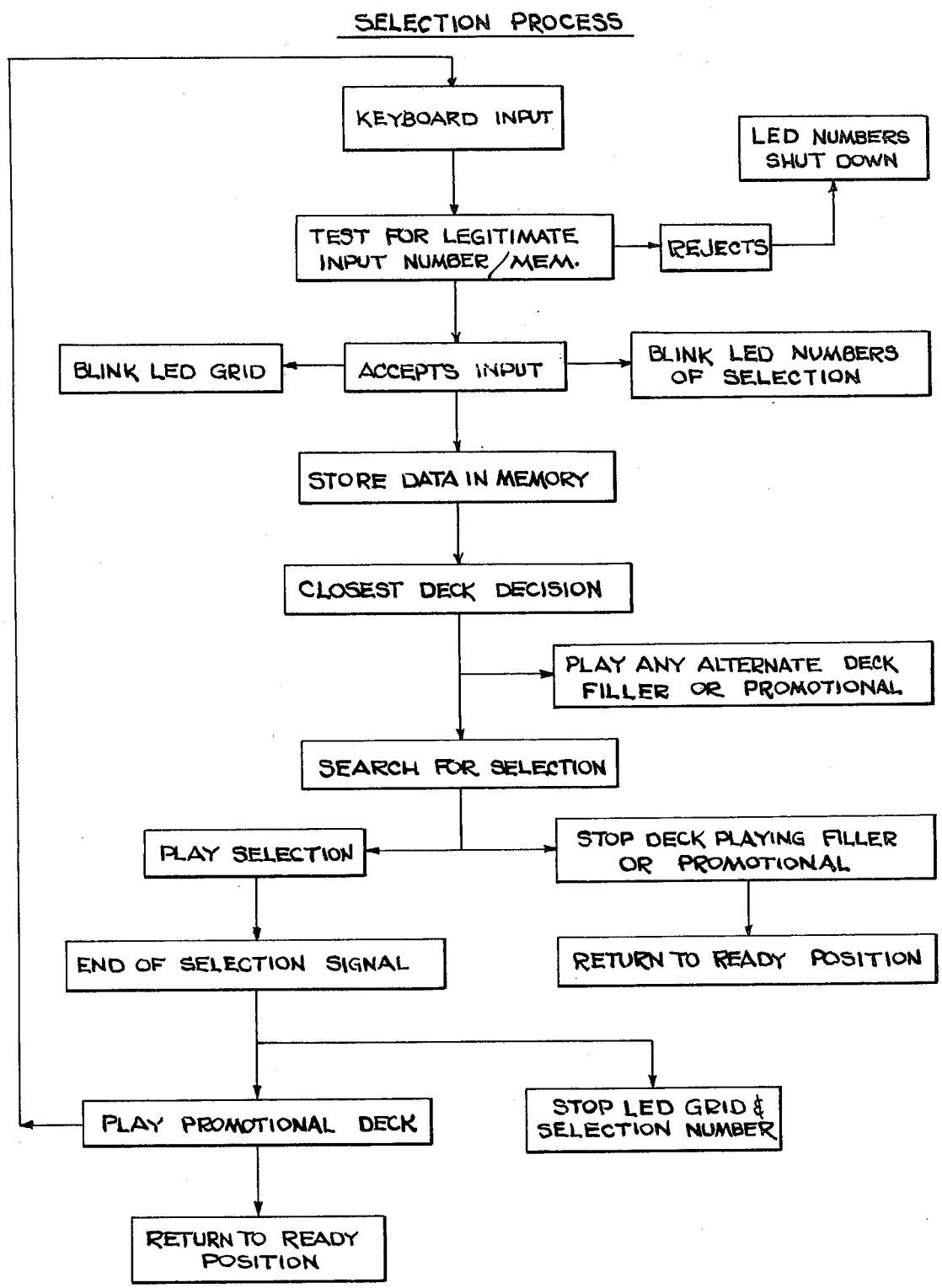

Having thus described the invention in general terms, reference will now be made to the accompanying drawings in which:

FIG. 1 is a front elevational view of one form of apparatus constructed in accordance with and embodying the present invention;

FIG. 2 is a top plan view of the apparatus of FIG. 1;

FIG. 3 is a schematic view showing a block diagram circuit of several of the major components forming part of the apparatus of the present invention;

FIG. 4 is a schematic view showing the relative locations of an initial start position and various messages pre-recorded on a video tape medium in accordance with the present invention;

FIG. 5 is a schematic view somewhat similar to FIG. 4, showing in more detailed form, the relative locations of an initial start position and various messages pre-recorded on a video tape medium in accordance with the present invention;

FIG. 6 is a schematic view showing segments of three different tapes in relation to a reading head on each of three different tape units and which arrangement may be used in the apparatus in the present invention;

FIG. 7 is a schematic circuit view showing one form of micro-processor which may be used in the apparatus of the present invention;

FIG. 8 is a schematic view showing a flow diagram for an initialization and short term process and which may be used in the apparatus in the present invention; and FIG. 9 is a schematic view showing a flow diagram for the selection process which may be used in the apparatus of the present invention.

BRIEF DESCRIPTION OF A PREFERRED EMBODIMENT

Referring now in more detail and by reference characters to the drawings which illustrate a preferred embodiment of the present invention, A designates an information selection and presentation system. This system generally comprises an outer housing 20 having side walls 24 and 26 along with a somewhat recessed front wall 28 and a control panel 30. Further, mounted below the control panel 30 is a removable cover plate 32 providing access into the interior of the apparatus for purposes of repair or the like. In addition, for convenience, a light housing 34 which suitably contains a flourescent tube, or similar light, (not shown) may be located at the upper end of the housing.

An opening 36 in the front wall 28 allows a screen 36 to be positioned in the housing 20. This screen 36 may comprise a reflective material, as for example, a movie screen in order to have a series of visual images displayed thereon. Further, the screen may comprise any medium capable of displaying visual images. In one of the preferred embodiments of the invention, the screen comprises a cathode ray tube, such as a television tube, as is frequently used with video tape equipment.

The apparatus also comprises a matrix of manually actuable input switches 40 in the form of depressable keys. These input switches 40 are designed to introduce an input code representing a particular selection which a user desires to review, as hereinafter described. In the specific embodiment as illustrated, twelve such input switches have been illustrated, although it should be understood that any number of input switches could be provided in accordance with the present invention.

The input switches are preferably labeled with a suitable input code which is used to represent the selections the viewer desires to review. For example, an alpha-numeric input encoding could be employed.

The input switches 40 actually project through the front of the control panel 30 and are preferrably suitably mounted to a circuit board or similar retaining member (not shown) and located within the housing 20. The retaining member, such as the circuit board, will suitably include either a diode or a capacitive matrix, or other form of signal generating means in order to generate a proper electrical signal in response to actuation of any one or more of the push button switches 40. In this respect, the push button switches 40 are actuable in pre-determined combinations in order to generate an input code representative of the desired selection.

Also located on the control panel 30 is a directory 42. This directory lists and identifies the various messages contained in the system along with the corresponding identification codes or so-called "input codes". In this respect, the directory 42 includes a grid of individually removable entries, as for example, paper or paperboard inserts which fit into individual envelopes for retaining the same. In this way, the change of individual programs may be obtained without necessitating the removal and recomposition of the entire directory. However, any form of providing a directory may be employed in accordance with the present invention.

In one of the more preferred aspects of the invention, the directory may contain the titles or identification of messages relating to consumer products and/or services. This is highly effective for consumers who visit a new location and need to obtain some information, other than that which might be presented in a written directory about various products and/or services which might be available.

In the case of a typical traveler who travels to a strange city, this traveler oftentimes needs to acquire information about, perhaps hotels, airline offices, etc. and availability of various service agencies such as barbers, or the like. By merely, selecting a particular entry in the directory, the user can observe the input code for that selection and introduce the input code with the keyboard switches. Thus, a presentation will be made on the display screen 36 along with a simultaneous generation of sound through a speaker as hereinafter described. Thus, the presentation may include a visual presentation of the rooms and/or facilities available at a selected hotel along with an oral presentation thereof.

Mounted within the housing 20 is a speaker 43 (shown in phantom lines) and is located immediately behind a plurality of speaker apertures 44 provided in the front wall 28 in the manner as illustrated in FIG. 1. The speaker is capable of having sound generated therefrom under the control of any suitable mechanism, as for example, a video tape deck, and would thus present the oral message along with a visual message on the screen 36.

The housing may be formed of any of a number of known structural materials, including wood, various metals such as steel, aluminum, or the like. In addition, the housing may also be formed of various plastic materials such as impact polystyrene, various polyvinylchloride copolymers and the like. In addition, the various components forming part of the housing may also be formed of reinforced plastic materials including, for example, fiberglass-epoxy resin combinations and the like. In essence, any structural material may be used provided that it is sufficiently sturdy to form the housing and support the various components therein, as hereinafter described in more detail.

The directory 42 may also be constructed in a form of a plurality of manually actuable input switches, in place of, or otherwise in addition to manually actuable input switches 40. Thus, in this way, the user may merely press a particular key or input switch in the grid of input switches which serve also as the directory as well. In other words, the directory could be subdivided so that each particular entry is also a keyboard switch.

The illustrated and described apparatus A may also be provided with a voice communication system, such as a telephone set. In this case, a hand set 45 of the telephone is illustrated as being mounted within a cradle 46 projecting through the front wall 28. The remaining portion of the telephone unit would be located immediately behind the front wall or otherwise elsewhere within the interior of the housing 20. In this way, the user can immediately attempt to call or initiate a telephone communication with a particular service organization or organization which is providing a particular product as identified on the directory 42. For this purpose, telephone keyboard input switches 48 are provided. Thus, a typical touch-tone telephone system signal generator, is provided immediately behind the keyboard pad 48 for initiating a telephone call.

It should be understood that in place of the keyboard switches 48 for use with the telephone, it is possible to use the same keyboard switches 40 which normally introduce the input code representing a particular message. Thus, by pressing a particular input switch or plurality of switches is predetermined combinations, which may represent a directory input code, the user can thereafter introduce a desired telephone number by actuating any of the keyboard switches 40. In like manner, it is also possible to construct the apparatus so that actuation of any keyboard switch in the directory, assuming the directory is used as keyboard switches, could be used for initiating a telephone communciation as well.

Also mounted within the control panel 30 or projecting through apertures therein is a matrix of light indicators 50. These light indicators may be small bulbs or otherwise light emitting diodes which project through apertures in the control panel 30 and which are capable of being illuminated to provide indication of a localized area. An overlay, such as a transparent sheet containing a geographical pattern, e.g. a map of an area of interest, (not shown) may be positioned over the indicator matrix. It can be observed that the matrix is in the form of a grid or grid pattern. In this way, when one of the elements of the indicator matrix is illuminated, a particular portion of the map overlaying that light emitting element will be highlighted. Thus, the users attention is directed toward that particular portion of the map overlay.

Considering for example, that the apparatus is designed to provide consumer or product information for a traveler. If the traveler is interested in obtaining information as to the general location or area in which an establishment providing that service or product may be located, it is only necessary to refer to the overlay and observe a particular portion of the overlay which is illuminated by the light emitting diode or other light emitting element.

The apparatus could be designed so that the light emitting elements are on during the entire presentation of a particular message, only a portion of the message. Further, it is not necessary that the light emitting elements be completely energized for duration of time, but rather, they could flash or adopt other forms of providing indication of a particular area or location.

Referring now to FIG. 3, the components forming part of the information selection and presentation system are presented and are described herein. These components as illustrated in FIG. 3 include a central controller and typically an electronic controller 60 along with four video tape decks designated as 62, 64, 66 and 68 and an electronically operable switch 70. In addition, the components illustrated in FIG. 3 include a timing circuit 72 which is connected to the controller 60 for operation of the same and a printer 74 generally of conventional construction and which receives an output from the controller 60. It is to be noted that the keyboard 40 and the light emitting diode matrix 50 was described previously in connection with FIG. 1.

The video tape unit 62 is sometimes herein referred to as the video tape unit-A or "VTU-A". The video tape unit 64 is sometimes designated as the B tape unit or "VTU-B", the video tape unit 66 is sometimes designated as the C tape unit or "VTU-C" and the video tape unit 68 is sometimes designated as the R tape unit or the "VTU-R". The first three decks 62, 64 and 66 are designed to present filler material as hereinafter described and the informational messages. The fourth deck 68 has a primary function of presenting the attractions or "teasers".

Each of the tape units 62, 64, 66 and 68 are illustrated in schematic block diagram form. Further, each are illustrated as having a particular message recordable tape with each in the form of a video tape cassette, illustrated in dotted lines, 76, 78, 80 and 82 loaded therein. The video tape units themselves are conventional in construction and therefore neither illustrated nor described in any further detail herein. The same holds true with respect to the video tapes as for example, the video tape cassettes used with these tape units.

As explained above the invention is not limited to any particular audio-visual display means. By example, film projectors could be used instead of video tape decks. In a similar manner video disc players would also be satisfactory. Virtually any device capable of translating recorded signals into visual and audio impressions could be used in the system disclosed herein. Thus, any video record receiving unit and any video record, such as disc or tape, could be used. For the sake of clarity most of the description of the preferred embodiment and specific examples contained herein are oriented toward video tape equipment. It should be understood that although video tape equipment is particularly suitable for the system, other audio visual equipment may be employed gainfully. In particular the discussion herein concerning video tape equipment applies equally to other types of audio-video display equipment.

As more fully described below, the controller has stored in its memory the locations of each of the programs on the record along with the identification code associated with the program. A code associating one of the indicator elements with the pre-recorded message is stored with the location thereof. The video tape decks 62, 64 and 66 each contain an identical tape upon which all of the messages are recorded. Further, all of the messages are recorded in the same order on each tape. The tape deck 68 contains a tape of promotional material that is displayed in order to attract the attention of passers-by.

The switch 70, which is preferably, although not necessarily a radio frequency operated switch or video switch, selects the signal from the appropriate tape deck to patch to the monitor 36. The switch 70 is also actuated by the controller 60.

The use of three tape decks with identical tapes greatly reduces the length of search time required to access the selected program. Generally speaking, the controller 60 will activate the tape deck that can access the selected program in the least amount of time.

The controller stores the number of times each program is selected and the operational mode of each of the tape decks. This information, together with the program identification code and the identification as to system location in which such tape was used, is printed out at the end of each day by the printer 74. The time circuit 72 provides the controller with the information necessary to decide when to shut down the system, i.e. at the end of the day, when to reassign the tape decks to a different segment of the tape, and when to activate the printer to print out the information described above.

A feature of the illustrated and described system is that is contains a large number of messages, but yet is able to access a selected message in a minimum amount of search time. In general this feature is accomplished by dividing the programs up among a plurality of tape decks. The advantages of such a system can be appreciated by examining the concept in an appropriate reference frame. Obviously, the best access time is obtainable if a separate tape deck is assigned to each message. In this case the access time is effectively zero since upon command the controller activates the appropriate deck. On the other hand the worst access time is obtainable with only one tape deck containing all of the programs. In order to access the last program on the tape the deck must wind nearly the entire length of the tape. The number of programs, the length of each program, and the desired access time are characteristics which to a large extent determine the number of tape decks employed by such a system.

The embodiment of the system described herein utilizes three tape decks, although it should be appreciated that a large number of tape decks can be used to decrease even further the time required to access the selected message. In this regard there is no limit to the number of tape decks utilizable with such a system.

Three decks are described herein for convenience and also since three decks represent a sufficient number to quickly access a reasonable number of different programs. It is to be noted that the discussion herein applies equally to systems incorporating any number of tape decks.

Another feature of the information selection and presentation system is that although each deck is assigned to only a subset of all of the messages, each tape nonetheless contains all of the messages. In this way the different decks can be assigned to present different sets or groups of messages without necessitating the change of tapes. This gives the individual program an extended life a well as allows the equalization of wear among the tape decks.

In each case, each tape will contain all of the messages which are to be presented and as indicated above, the messages on each tape are identical and in the same format and sequence. Further, each tape unit will present a number of messages only in the assigned group and that number of messages is less than the total number of messages on tape and more specifically, substantially less than the total number of messages on each tape. In one of the more preferred embodiments of the invention, the number of messages in any group is approximately equal to the total number of messages on any one tape divided by the number of tape units and associated tapes which are to be used. Thus, for example, if there are a total of 90 messages on each tape, and which messages are identical as aforesaid, and further, if three tape units along with three associated tapes are to be used in the system, then each group will contain 30 messages.

The following sets forth certain embodiments of tape formats. The times and frequencies and numbers of messages are only representative and not limiting to the invention. Thus, for example, if any one of the first thirty messages is selected, then tape unit A will present the selected message and if any one of the second thirty messages, which is a message in the second group, is selected, then that message will be presented by the second tape unit B, and if any one of the messages in the third group of messages, which is the last thirty of the messages, is selected, then that message will be presented by the tape unit C.

It is also possible to divide the number of messages assigned in each group and hence the messages presented on each tape by the duration of time which the messages take to present. Thus, for example, tape unit A could be assigned to present a number of messages where the time duration to present all messages is approximately equal to the time duration to present all messages which are assigned to be presented by tape unit B and which will be approximately equal to the time duration required to present all of the messages which are assigned to be presented by tape unit C.

The format of each tape is illustrated in FIGS. 4 and 5. The first thirty seconds of the tape is reserved for loading the controller as more fully described below. The controller contains a programmed read only memory or so-called "Prom" associated with each of the tape decks, as hereinafter described. The first function performed by the tape is to load the Prom's. Information regarding the location of each of the messages, the identification code associated with that message, and the indicator element associated with that is read into and stored by the Proms.

The individual messages themselves are contained on the tape following the thirty-second load section. A standard one-hour tape can be conveniently divided into three sections. The format of each group is the same, the only difference among the group being the particular messages thereupon. As is readily apparent from the Figure each group contains a plurality of messages with each separated by a seven-second gap. For illustrative purposes each program is shown as being thirty-seconds in duration. Although thirty seconds does appear to be an appropriate length of time to convey a message without boreing the viewer, there is nothing magical to this length. The tape could just as easily contain messages of a variety of different lengths, as aforesaid. Thus, a five-second message as well as a ten-minute message could be contained on the tape. In this regard it is noted that in actuality it is unlikely that all of the messages will be exactly thirty-seconds in length. Thus, the time spans indicated herein are approximate only and it should be understood that virtually any time span for a message which is no longer or shorter than a group is permissible.

As mentioned, each message is preceeded by a seven second gap. This gap facilitates the cueing of the selected message. As is more fully described below, the locations of the particular message are stored as units of distance on the tape. Specifically the location is identified as the distance from a particular position on the tape. These positions are not very precise for several reasons. One is that the tape decks are not capable of precisely measuring distances on the tape. Another is that the tape itself may elongate somewhat after use. Therefore, the seven second gap serves as a buffer area which allows the tape deck a larger margin of error in tracking down the location of the selected message. The seven second buffer provides a large enough area which, combined with the limited accuracy of the distance measurements of the tape deck, virtually guarantees that the end of the previous message will not be inadvertently displayed before the beginning of the selected message.

Each segment of the tape contains an initial start position, often referred to as a "ready" position intermediate the first and last messages in each group, and preferably in approximately the center of the group. This ready position is initially located at a tape reading member, e.g. a tape reading head and is where the tape stays while waiting for a program to be selected. By waiting in the middle of the group instead of at one end, the worst case search time is cut in half. Of course, not only is the worst case search time reduced but the search time required to access any of the programs on the furthest half of the tape is also reduced.

In one aspect of the invention, the ready position or initial start position is a gap on the tape of about 15 seconds duration for a normal running speed of the tape deck. This ready position gap allows for any non-linearities in the tape or tape expansion, and thereby obviates the need for precise control. Immediately preceeding the ready position is a selected frequency tone and then a 5 second gap. Further, each message is idenfified by a code introduced into the program read only memory as indicated above. Each message is defined by an end of message tone which immediately follows the end of the message. The end of the message tone is of a frequency which is different than the tone defining the initial start position. Thus, by reference to FIG. 4, it can be observed that the initial start position or ready position is defined by reference numeral 120 and the 5 second gap immediately preceeding and following the ready position 120 is identified by reference numeral 122 and 124. The frequency tone of, for example, 40 Hertz is identified by reference numerals 126 and 128 also on each side of the ready position.

After the end of the message, there is an end of message tone which immediately advises the tape deck to advance the tape to the ready position. Five seconds in advance of the ready position, the ready position indicating signal 126 or otherwise the signal 128 will be generated. This is then succeeded by the 5 second gap of 122 or 124 unitl the tape deck advances the tape to the ready position 120.

Obviously, these tones can be of a variety of frequencies so long as each tone is used for only one indicating signal. Thus, one frequency can be used to represent the end of message tone, and either another frequency or the same frequency can be used to represent the ready position indicating tone.

This use of gaps and the indicating tones as described above, allows the system to be constructed with relatively fewer components than would otherwise be required if strict critical positions were to be defined on the tape and in the controller. Further, significantly less programming is involved which thereby reduces the overall cost of the system as such.

As mentioned above, the tape format allows each tape to contain all of the programs held in the system. Thus, it is not necessary to change tapes to reassign the different tape decks to different segments or groups of messages. The reassignment process can be understood best by referring to FIG. 6. This FIG. 6 illustrates the three tape decks 62, 64, and 66, respectively labeled A, B and C. Each tape deck is schematically shown as having a tape reading head such as the tape heads 84, 86 and 88, respectively.

Associated with each of the tape decks is a representation of a tape as for example, the tapes 76, 78 and 80 as previously described. Each of the tapes is divided into three groups labeled respectively I, II, III. The juxtaposition of the tape upon the representation of the reading heads 84, 86 and 88, indicates the particular day. For instance, the tapes labeled 76, 78 and 80 indicate the group assignment for day one. As is readily apparent from an examination of the figure, on day one tape deck A is assigned to group I, tape deck B is assigned to group II and tape deck C is assigned to group III.

By way of example, assume that each tape segment or group contains thrity-three messages. Therefore, each time that the user selects one of the first thirty-three messages tape deck A will access and play the message. In a similar manner, each time that a user selects one of the messages 34 through 66 tape, deck B will access and play the message. Likewise, each time a user selects one of the messages sixty-seven through ninety-nine, tape deck C will access and play the message. By way of further example, assume that a particularly popular message is message number twenty-three. That is to say, the popular message is contained on the segment I of the tape. Further assume that this particular message is selected at a frequency or rate considerably higher than the frequency or rate of selection of the other messages. It is easy to see that at the end of day one, tape deck A will have been subjected to much greater use than either tape deck B or tape deck C. It is equally easy to see that the particular portion of the tape associated with tape deck A containing the popular message will have received more wear than the other portions of the tapes.

After the reassignments are made on day two, as represented in FIG. 6 by tapes 76', 78' and 80', tape deck A is assigned to the middle segment, e.g. group II, of the tape. In a similar manner tape deck B is now assigned to the third segment, e.g. group III, of the tape and tape deck C is assigned to the first segment, e.g. group I. Thus on this second day, assuming the tastes of the users remain relatively constant, tape deck C will receive the most wear. It is also noted that the particular portion of the tape on deck A, that is, program number twenty-three, that was subject to so much use on day one would not necessarily be used at all on day two or three since that group or subset containing message number twenty-three would be played by tape on tape deck B.

As can be seen from FIG. 6 on day three tape deck B is assigned to segment I of the tape. This effectively equalizes the wear of the three tape decks over time. Thus, after the reassignments are again made on day three as represented in FIG. 6 by tapes 76", 78" and 80", tape deck A is assigned to the last segment, e.g. Group III, of the tape. In a similar manner tape deck B is now assigned to the first segment, e.g. Group I, of the tape and tape deck C is assigned to the middle segment, e.g. Group II. On this third day, and again assuming the tastes of the users remain relatively constant, tape deck B will receive the most use.

The controller 60 comprises a micro-processor with a random access memory and a read only memory. Any of a variety of micro-processors marketed by various electronics companies may be employed. There are available integrated circuit chips containing most or all of the elements necessary for the micro-processor.

In one embodiment of the present invention, the micro-processor is an MC6800 offered by the Motorola Corporation. This particular micro-processor requires the use of a compatable random access memory and read only memory. The ready only memory may be suitably programmed with proper program steps in order to perform the various functions heretofore described.

A schematic diagram of the operation of the controller is illustrated in FIG. 7 of the drawings. It should be understood that the various flow lines as illustrated in FIG. 7 actually show the movement of data and do not necessarily describe the actual interconnection of the various components. It should also be understood that although FIG. 6 illustrates the controller as comprising the heretofore described Motorola micro-processor, the actual controller is not limited to any particular type of processing unit.

A read only memory 90 operates in conjunction with a program counter 92 of the micro-processing unit. The program counter is basically designed to keep track of the instructions introduced into the read only memory 90. The program counter 92 initiates an input into the read only memory 90.

The micro-processor also is provided with a timing cicuit 94 in the form of a two-phase clock which generates timing signals for all of the various components illustrated in the figure. However, other forms of timing may be provided. Hereagain, it should be understood that the various flow lines as illustrated actually show the movement of data and do not necessarily describe the actual interconnection of the various components. In this respect, it should be understood that the two-phase clock 94 would essentially be connected to practically all of the components as illustrated, in order to provide the proper timing signals thereto.

The micro-processing unit also comprises an instruction decoder 96 which receives an output from the read only memory 90 and implements specific sequences of connection between the various components forming part of the micro-processor. In this respect the program counter 92 has an output which is connected to the read only memory 90. Further outputs of the read only memory 90 are introduced into a page address register 98. The page address register is designed to further address an access data which is in the read only memory.

The controller also includes a random access memory section 100. As illustrated the random access memory section 100 comprises three random access memories 102, 104 and 106, (often referred to as "RAM" or "RAMS") each one associated with a separate tape deck. The random access memory section 100 is used to store variable data quantities used in various operations and which are provided for execution of the program introduced into the read only memory 90. In particular the random access memory section 100 stores the coded sequence of alpha-numeric characters associated with the messages, the location of the messages, and the illuminating element, e.g. diode 50, associated with the messages. In this regard the random access memory 102 could, for instance, store all of the above described information from the tape on the tape unit 62, and the memory 104 could store all of such information from the tape on the tape unit 64, etc. The micro-processing unit also comprises an arithmetic logic unit 108 which is designed to receive and operate on data introduced into the read only memory 90 in accordance with the instructions which have been introduced into the read only memory 90. The arithmetic logic unit 108 receives data from the read only memory 90, and further, receives data from the random access memory 100. In addition, information may be introduced into the micro-processor through an input 110.

The random access memory 100 operates in conjunction with an X-register 112 and a Y-register 114. The X-register 112 and the Y-register 114 are designed to address locations in the random access memory 100 and to access the memory therein. In addition, an accumulator register 116 operates in conjunction with the random access 100 and supplies information thereto. The accumulator register 116 operates to store data used in the execution of the program and further provides information to an output 118.

The various components heretofore described as forming part of the micro-processor or so-called "micro-computer" receive information inputs in the manner as illustrated in FIG. 7. The inputs may be from the input keys 32 or from the individual tape decks. The software program may be imbedded in the micro-computer during wafer processing by a single level mask technique, which in essence defines the fixed read only pattern.

In order to start the sequence in operation, the power to the micro-processor is first initiated by turning on a master on/off switch 120. The two-phase clock 94 will start generating the timing signals for the operation of the micro-processor. The program counter 92 then provides location information to enable accessing a certain location in the read only memory 90 in which the first instruction is obtained. This instruction is then introduced and loaded into the instruction decoder 96, and this, in turn, establishes various instruction paths between various elements of the micro-processor, depending upon the specific instruction itself. This process is then repeated over and over with the program counter 92 then advancing to the next instruction contained in the read only memory 90. External numeric inputs to the arithmetic logic unit 108, e.g. the input code from the keys 32, may be input at appropriate times as indicated by the instruction decoder 96.

After information is introduced into the arithmetic logic unit, for example, the next instruction could be the setting of the X-register 112 and the Y-register 114 to address a location in the random access memory 100. A following instruction could transfer that information from the arithmetic logic unit into the random access memory 100. Other instructions would be used for introducing data into the accumulator register 116, functions such as rewinding a tape deck are created by instructions which are introduced into the outputs 118.

Additional instructions might be loaded into the Y-register for activating the printer. Thus the micro-processor will function in a known manner in accordance with the instructions contained in the program introduced into the micro-processor.

Initially the messages are prepared and recorded on the tape in the format described above in connection with FIGS. 4 and 5. The messages are then viewed and timed in order to determine their respective locations on the tape. A different sequence of alpha-numeric characters is assigned each of the messages on the tape. Any sequence of numbers can be used to identify a particular message. The sequence of numbers may be arbitrary or it may have its own independent significance. For instance, the catalog number of the part described in the message could serve as the coded number referring to that message.

The coded sequence of characters together with a number indicating the position of the message on the tape and the illuminating element associated with the message is then recorded on the beginning of the tape as indicated earlier in connection with the discussion of FIG. 5.

The location of the message on the tape may be stored in any suitable manner. Thus, the locations may be stored as distances on the tape. In particular, the location may be stored in terms of distance from a particular point on the tape. In the preferred embodiment of the invention each message is identified in terms of its distance from the closest ready position on the tape.

The tapes are threaded on the video tape decks and played sequentially in order to load the random access memories. As heretofore explained, the first thirty seconds of the tape contains the information necessary to load the random access memories. Since the tapes played on the three machines are identical, the three random access memories associated with the respective tape decks should contain identical information. In order to guarantee that the three tapes are in fact identical, the controller compares the information loaded into the three random access memories. If, as may happen inadvertently, an improper tape has been placed on one of the tape decks, the controller can identify the deck with the improper tape by comparing the information stored in each of the random access memories. In other words, consider the situation wherein tape decks A and B have been supplied with the correct identical tapes but tape deck C is supplied with a mismatched, or incorrect, tape. After the random access memories are loaded, those associated with tape decks A and B will contain the same information. However, the random access memory associated with tape deck C will contain information corresponding to the mismatched tape. When the controller compares the information stored in the three random access memories, it will identify tape deck C as containing an improper tape. In such a situation the controller considers tape deck C a failed unit and assigns the segment of the tape that would have been assigned to tape deck C to either tape deck A or B.

This safety feature effectively prevents many of the problems associated with positioning mismatched tapes on the tape decks. Were it not for this feature, a mix up of the tapes could result in the display of the wrong message. Such a mix up could also result in the initiation of a message at a point other than the beginning of the message.

Once the Rams are loaded and compared, the system is ready for operation. The controller turns on the promotional tape deck which plays a message designed to attract the attention of any one in the area. For example, a message could contain music, voice and pictures indicating what type of information is contained in the system. Thus, if the system were located in an airport terminal and if the messages therein related to hotels, restaurants, and transportation services, the promotional message might ask "looking for a hotel?", etc. The promotional tape lasts for one hour and plays continuously until someone selects a message.

When a message is selected, the controller performs a number of functions. First, it determines which of the three decks is assigned to the tape segment containing the selected message. Secondly, the controller stops the promotional deck. Thirdly, the controller plays the filler message from one of the two tape decks not assigned to the segment of the tape containing the selected message. Fourthly, while the filler material is being played, the controller causes the appropriate deck to find the selected message and play it. Fifthly, the controller rewinds the deck that displayed the filler message until the ready position of the tape is next to the play-back head of the tape deck. Sixthly, the controller activates the appropriate illuminating element under the overlay.

The controller is programmed such that if two of the tape decks are rewinding while the third tape deck is searching for the selected message, it will activate the promotional deck to insure that some message is always being displayed.

The controller may also be programmed to allow the replay of a message. Thus, if the viewer wants to see and hear a selected message again he may press a repeat button. The controller will cause the tape deck to rewind the tape to the beginning of the message and then commence the play thereof. Note that while the deck is rewinding one of the other two decks will be activated to display the filler material as heretofore described.

As pointed out above, the promotional tape lasts for one hour. The controller is adapted to identify when nine-tenths of the length of the promotional tape has passed. The controller will then cause the promotional tape to rewind as soon as another deck is played. For instance, when an individual selects a message, the controller starts to rewind the promotional tape while playing the filler message and searching for the selected message. As soon as the promotional tape is scheduled again, i.e. when the selected message ends, the rewinding stops and the promotional tape plays from whatever location it is positioned. If the promotional deck has not completely rewound its tape, it will again rewind at the next opportunity, i.e. when another selection is made.

The promotional deck will not rewind again until after the ninty percent signal has been encountered as described above. Should the promotional tape reach its end, the tape deck will automatically rewind the tape, leaving the screen dark in the meantime.

At the end of the day the printer prints out the identification numbers associated with the messages, the locations of the system on which the tape was used, the number of times each message had been selected, and the operational mode of each deck identifying those decks experiencing failures. The controller activates the printer to execute these functions at the appropriate time, i.e. at the end of the day in connection with the clock 62. Each morning the controller reassigns the three decks to different segments of the tape as explained above in connection with FIG. 6.

FIGS. 8 and 9 illustrate a flow chart showing a representative form of a program for the micro-processor. The micro-processor is only a part, although a major component of the controller. As FIG. 8 illustrates, to commence operation of the system the power must first be turned on. This is followed by a short time delay to allow the voltage to assume its normal operating level. The controller causes tape decks A, B and C to play the beginning thirty seconds of their respective tapes. It will be recalled that the first thirty seconds of each tape contains information regarding the identification of the various messages contained on the tape and their respective locations. This information is read into the random access memories and stored.

The information contained in the three random access memories is compared to determine if one of the decks has the wrong tape. A deck containing a wrong tape is turned off and effectively removed from the system. In a similar manner, if one of the decks has no tape or there is no information on the first thirty seconds of one of the tapes, that deck is shut down. It will also be recalled that if one of the decks fails to operate properly that deck is also turned off.

Once the random access memories are correctly loaded, the controller assigns each of the three tape decks to a different segment of the tape. Each deck will wind the tape contained thereupon until the appropriate ready position on the tape is aligned with the playback head of the deck. As heretofore described a particular signal on the tape indicates the location of the ready position. The promotional deck commences operation displaying the "tease" or "grabber" message. This deck will rewind at appropriate times as described above in more detail. Once the promotional deck begins operation the system is ready for an individual to select a message.

FIG. 9 illustrates a flow chart for the programming related to the selection of a message. An individual selects a message by inputting the appropriate code through the keyboard input.

The controller determines whether the input is legitimate, i.e. whether the input actually identifies one of the messages on the tape. The controller ignores inproper inputs. When a correct input has been inserted, the controller causes the light elements above the keyboard to blink the numbers of the selection. In addition, the microprocessor determines the location of the selected message as well as the appropriate light element of the matrix to energize.

The identification of the message selected is read into a random access memory and the counter associated with that message is increased in order to tally the number of times that the message has been selected. The controller determines which segment of the tape the selected message is on and to which tape deck the appropriate segment of the tape has been assigned. The filler message or promotional message, as previously described in detail, is played while the appropriate deck searches for the selected message. Once the message has been accessed the filler message or promotional message is stopped and the selected message commences play. The deck playing the filler message is rewound to its ready position while the selected message is played.

It may be recalled that the tape contains a signal identifying the end of the message, once this signal is encountered the light element of the matrix under the overlay as well as the light elements identifying the selection are turned off, the promotional deck recommences operation and the deck displaying the selected message returns to its ready position. Referring again to FIG. 8 it will be noted that at the end of the day the printer outputs the data collected during that day afterwhich the system is shutdown until the next day.

Thus, there has been illustrated and described a unique and novel apparatus and method for locating and presenting pre-recorded information and preferably on pre-recorded video tapes on a highly efficient basis. Accordingly, the illustrated and described apparatus and method fulfills all of the objects and advantages sought therefore. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described our invention, what I desire to claim and secure by Letters Patent is:

1. An informational display system for use in a commercial establishment for providing promotional information regarding consumer products or consumer services to enable a potential purchaser to compare products or services and to determine which of the available products or services to purchase, said system comprising:
   (a) an outer housing,
   (b) a plurality of manually operable switches on said housing so that one or more of said switches can be operated to introduce an input code relating to individual ones of said products or services,
   (c) a video display screen on said housing,
   (d) speaker means on said housing,
   (e) a controller operatively connected to said plurality of switches and said display screen and speaker means for controlling operation of said display screen and speaker means in response to an introduced code, and
   (f) a video unit operatively connected to said controller for receiving a video record member containing informational messages about said consumer products or consumer services so that the controller can select the proper informational messages on the video record member corresponding to the introduced code and cause the message to be displayed on the video screen and presented simultaneously on the speaker means to thereby enable a potential purchaser to compare products or services and determine which of a potential product or service to purchase.

2. The informational display system of claim 1 further characterized in that said video unit is a tape operated video unit, and said video record member and video unit is located in said housing, said system comprising a telephone handset operable with said controller and speaker means, and signal generating means on said cabinet for selecting and introducing a phone number corresponding to a particular location for which a message may be generated on said system.

3. The informational display system of claim 2 further characterized in that said switches are push-button switches which are manually operable in predetermined combinations to generate the proper input code.

4. The informational display system of claim 1 further characterized in that said controller is a central controller which is at least partially pre-programmed, and said controller being operatively connected to said input switches and display screen and speaker means and video unit.

5. The informational display system of claim 4 further characterized in that said system comprises a plurality of video units operatively connected to said controller, said controller controlling the operation of the video units to present a selected message, and where the same messages are on video tapes located in each of the video units.

6. The informational display system of claim 1 further characterized in that said system comprises a telephone receiver mounted in said housing and a hand-set operable with said receiver, and signal generating means on said cabinet for selecting and dialing a phone number corresponding to a particular location for which a message may be generated on said system.

7. The informational display system of claim 1 further characterized in that a plurality of lights is associated with said housing, each of said lights being associated with a particular geographical area and presenting locations where a selected product or service can be obtained, said lights being energizable in response to generation of an input code for an associated product or service.

8. The informational display system of claim 7 further characterized in that an overlay containing a map of the geographical area and which is at least partially transparent may be disposed over said lights to represent a location of a selected product or service.

9. The informational display system of claim 1 further characterized in that said system comprises a printer associated with said housing and is operatively connected to said controller, said printer being operable to print out selected information relating to message frequency use or operation of said system.

10. The informational display system of claim 1 further characterized in that said system comprises a timing circuit operatively connected to said controller for controlling the time of operation of various functions performed by said system.

11. The informational display system of claim 10 further characterized in that said system comprises electronically operable switch means operatively connected to said video unit and controller and timing circuit for controlling operation of said video unit.

12. A system for presenting information pre-recorded on tape medium, said system comprising:
   (a) a plurality of cooperating tape units including at least a first tape unit and a second tape unit, (b) an individual tape on each one of the tape units including at least a first tape operable on said first tape unit and having a plurality of different informational messages pre-recorded thereon, and a second tape operable on said second tape unit and having a plurality of different informational messages pre-recorded thereon and where each of the messages on each one tape are substantially identical to corresponding ones of the messages on each of the other tapes, (c) presentation means operatively connected to said tape units to present the messages on said tapes, (d) electronic control means operatively connected to each of said tape units and controlling operation of same, and (e) selection means operatively connected to said control means and being operable to select any one of the plurality of messages pre-recorded on each of said tapes, said control means being operable to effectively divide the number of messages on each tape into a plurality of groups of messages and where the number of messages in any one group is substantially similar to the number of messages in each other group on each of said tapes, said control means assigning each of said tape units to present only one group of messages on the tape associated with that tape unit with each tape unit being assigned a different group of messages so that each group of messages is assigned to one of the tape units, whereby all of said tape units in combination will present on the presentation means all of the messages on said tapes.

13. The system of claim 12 further characterized in that the messages presented by each tape unit are normally equal to the total number of messages on any one tape divided by the total number of units used in the system for presenting messages.

14. The system of claim 13 further characterized in that said system comprises at least three tape units for presenting messages and each such tape unit presents normally no more than about one-third of the messages on a message containing tape.

15. The system of claim 12 further characterized in that said presentation means comprises a video tape display member, said units are video tape units and said tapes are video tapes.

16. The system of claim 15 further characterized in that each video tape comprises a tape medium having the plurality of messages pre-recorded thereon including a first message and a last message and at least one message therebetween, a tape ready position intermediate the first and last messages on the tape and defining a position for the tape to be stationed when the ready position is adjacent to a tape reading member, a tape ready positon indicating tone on each side of said ready position and being of a first frequency, a gap on each side of said ready position between each of the tape ready position indicating tones and said ready position, an end of message tone to identify the end of each message, and a fixed length gap preceeding each of the messages on the tape.

17. The system of claim 15 further characterized in that said presentation means comprises speaker means to present sound messages recorded on said video tapes.

18. The system of claim 12 further characterized in that said electronic control means monitors the number of times certain of the messages have been presented and thereafter reassigns the groups of messages to be presented by each message containing tape unit to reduce tape wear.

19. The system of claim 12 further characterized in that said control means causes each of said message containing tapes to be read to insure that the messages on each such message containing tape are substantially the same.

20. A system for locating and presenting any of a plurality of pre-recorded messages on video tape medium in a relatively short time period without the necessity of moving a tape for a distance in excess of half the length of the tape, said system comprising:

(a) a first video tape unit capable of receiving a first video tape containing a plurality of messages, (b) a second video tape unit capable of receiving a second video tape containing the same plurality of messages and each of such messages on said second tape are substantially identical to corresponding messages on said first tape, (c) a first message reading member on said first tape unit for reading messages on said first tape, (d) a second message reading member on said second tape unit for reading messages on said second tape, (e) selection means for selecting any of said messages on said first and second tapes, and (f) control means operatively connected to said first tape unit and to said second tape unit and to said selection means, said control means allocating a first portion of the messages on said tapes for presentation by said first tape unit and a second portion of the messages on said tapes for presentation by said second tape unit, and where the length of the tape containing the first portion of the messages of each tape is substantially equal to the length of the tape containing the second portion of the messages on each tape, said control means also selecting an initial start location intermediate the first and last messages in the first portion and initially positioning said initial start location of the first portion of the first tape at said first reading member, such that the access time to select any message in the first portion of the messages is no greater than the amount of time for the first tape to move from the initial start location to the first or last message in that portion of the first tape, said control means further selecting an initial start location intermediate the first and last message in the second portion and initially positioning said initial start location in the second portion of the second tape at said second reading member, such that the access time to select any message in the second portion of the tape is no greater than the amount of time for the second tape to move from the initial start location for the second portion to the first or last message in the second portion of the second tape, whereby a selection introduced into said system will cause said control means to enable movement of said tapes in either one direction or the other from the initial start location to the selected message.

21. The system of claim 20 further characterized in that the number of messages in the first portion of messages on the first tape is approximately equal to the number of messages in the second portion of messages on the second tape.

22. The system of claim 21 further characterized in that said system comprises at least three video tape units for presenting messages and each said tape unit presents no more than about one-third of the messages on each message containing tape.

23. The system of claim 20 further characterized in that a video display member is operatively connected to each of said video tape units for presenting said messages in video form.

24. The system of claim 21 further characterized in that said control means monitors the numbers of times certain of the messages have been presented and thereafter reassigns the groups of messages to be presented by each tape unit which enables reduction of tape wear.

25. The system of claim 21 further characterized in that said control means causes each of said message containing tapes to be read to insure that the messages on each such tape are substantially the same.

26. The system of claim 20 further characterized in that each video tape comprises a tape medium having the plurality of messages pre-recorded thereon including a first message and a last message and at least one message therebetween, a tape ready positon indicating tone on each side of said start location and being of a first frequency a gap on each side of said ready position between each of the tape ready position indicating tones and said ready position, and end of message tone to identify the end of each message, and a fixed length gap preceeding each of the messages on the tape.

27. A method for addressably encoding addresses of a plurality of messages on a video tape medium into a memory of a video tape unit used to play the video tape medium to enable later selection and retrieving of said messages, said method comprising:
(a) providing an address section on the tape medium for recording address codes representative of message locations on the tape medium and where each message location represents a portion of a message to be presented, and each message location has an individual address code representing that location,
(b) assigning an address code of indicia for each message on the tape,
(c) recording the address code for each message on the address section of the tape medium,
(d) automatically loading the address codes into a control memory associated with a video tape unit on which the tape medium is to be used so that the address section of the tape medium and the control memory have corresponding address codes for each of the message locations, and
(e) automatically retrieving a selected message by introducing the address code of that message such that the introduced address code enables automatic location of the selected message through the addresses recorded in the control memory on the tape medium.

28. The method of claim 27 further characterized in that said address section of the tape medium is located close to the beginning of the tape medium.

29. The method of claim 27 further characterized in that a plurality of video tape mediums are employed and each generally have the same messages, and the method comprises the addressably encoding the address code of each message on the address section of the associated tape medium.

30. A method for locating and presenting messages on a tape medium, said method comprising:
(a) providing a plurality of tapes capable of being read on tape units and having messages thereon presented and where the messages on each one of the tapes are substantially identical to corresponding ones of the messages on each of the other tapes,
(b) dividing the messages on each of the tapes into a plurality of groups of messages and where the number of messages in any one group is substantially similar to the number of messages in each other group on each of the tapes, and
(c) assigning one group of messages on each of the tapes to be presented from that tape and assigning each one of the other groups of messages to be presented by different ones of the tapes, so that each group of messages is assigned to be presented from one tape and so that the number of messages to be presented by any one tape is less than the total number of messages on the tape and is different than the group of messages to be presented by any other tape.

31. The method of claim 30 further characterized in that the method comprises assigning approximately the same number of messages to each tape for presentation.

32. The method of claim 31 further characterized in that the number of messages in each group of messages is approximately equal to the number of total messages on any one message containing tape divided by the number of message containing tapes to be used in any one system.

33. The method of claim 30 further characterized in that each of said tapes are located on individual tape units and each tape unit presents only the group of messages assigned for presentation on the associated tape.

34. The method of claim 33 further characterized in that said tapes are video tapes and the tape units are video tape units.

35. The method of claim 30 further characterized in that said method comprises monitoring the number of times that certain of the messages have been presented and thereafter reassigning the groups of messages to be presented by any one tape in order to reduce tape wear.

36. The method of claim 30 further characterized in that said method comprises reading each of the message containing tapes to insure that the messages on each of said tapes are substantially the same.

37. The method of claim 30 further characterized in that said method comprises providing an initial start location between the first and last messages in each group of messages and which start location does not contain any message thereon.

38. The method of claim 37 further characterized in that said method comprises locating each tape on a tape unit such that the initial start location is located in proximity to a tape reading head on the tape unit and which permits searching for a selected message by moving the tape to the right or the left of the reading head.

39. The method of claim 38 further characterized in that the initial start location is located approximately midway between the first and last messages in the group of messages.

40. A video tape comprising a tape medium having a plurality of messages pre-recorded thereon including a first measage and a last message and at least one message therebetween, a tape ready position intermediate the first and last messages on the tape and defining a position for the tape to be stationed when the ready position is adjacent to a tape reading member, a tape ready position indicating tone on each side of said ready position and being of a first frequency, a gap on each side of said ready position between each of the tape ready position indicating tones and said ready position, an end of message tone to identify the end of each message, and a fixed length gap preceeding each of the messages on the tape.

41. The video tape of claim 40 further characterized in that the gap preceeding each message is about five seconds and the gap on each side of the ready position is about seven seconds.

42. The video tape of claim 40 further characterized in that said ready position has close to a zero time duration.

43. An informational display system for use in a commerical establishment for providing promotional information regarding consumer products or consumer service to enable a potential purchaser to compare products or services and to determine which of the available products or services to purchase, said system comprising:
(a) an outer housing,
(b) a plurality of manually operable push-button switches on said housing so that said switches can be operated in predetermined combinations to introduce an input code relating to individual ones of said products or services,
(c) a video display screen on said housing,
(d) speaker means on said housing,
(e) a controller operatively connected to said plurality of switches and said display screen and speaker means for controlling operation of said display screen and speaker means in response to an introduced code,
(f) a plurality of cooperating video tape units operatively connected to said controller with each receiving a video tape containing informational messages about said consumer products or consumer services so that the controller can select the proper informational messages on the video tapes corresponding to the introduced code and cause the messages to be displayed on the video screen and presented simultaneously on the speaker means, to thereby enable a potential purchaser to compare products or services and determine which of a potential product or service to purchase, and where the same messages can be presented from each video tape,
(g) a telephone receiver mounted in said housing and a handset operable with said receiver,
(h) signal generating means on said housing for selecting and introducing a telephone indicia corresponding to a particular location for which a message may be generated on said system,
(i) a grid having a plurality of interesting lines representing geographical locations for certain consumer products or consumer services,
(j) a plurality of lights associated with said housing, each of said lights being associated with a particular area and being energizable in response to generation of an input code for a selected product or service,
(k) an overlay containing a map of the area in which the consumer products and services are available to the user of the system, and which is at least partially transparent for disposition over said lights to locate a selected product or service location with respect to said grid, and
(l) a timing circuit operatively connected to said controller for controlling the time of operation of various functions performed by said system.

44. The informational display system of claim 43 further characterized in that said lights are light emitting diodes.

45. The informational display system of claim 43 further characterized in that said system comprises a printer operatively associated with said housing and which is capable of being operatively connected to said controller, said printer being operable to print out selected information relating to use or operation of said system.

46. The informational display system of claim 43 further characterized in that said system comprises electronically operable switch means operatively connected to a video unit associated with said video screen and controller and timing circuit for controlling operation of said video unit.

47. An informational display system for use in a commercial establishment for providing promotional information regarding consumer products or consumer services to enable a potential purchaser to compare products or services and to determine which of the available products or services to purchase, said system comprising:
(a) an outer housing,
(b) a plurality of manually operable switches on said housing so that one or more of said switches can be operated to introduce an input code relating to individual ones of said products or services,
(c) a video display screen associated with said housing,
(d) speaker means on said housing,
(e) a video tape unit assembly operatively connected to said controller for receiving video tapes containing informational messages about said products or services so that the proper informational messages on the video tapes corresponding to the introduced code can be selected and cause the messages to be displayed on the video screen and presented simultaneously on the speaker means, said video tape unit assembly comprising:
(1) a first video tape unit capable of receiving a first video tape containing a plurality of messages,
(2) a second video tape unit capable of receiving a second video tape containing the same plurality of messages and each of such messages on the second tape are substantially identical to corresponding messages on said first tape,
(3) a first message reading member on said first tape unit for reading messages on said first tape, and
(4) a second message reading member on said second tape unit for reading messages on said second tape,
(f) an electronic control means operatively connected to said plurality of switches and said display screen and speaker means and video tape units for controlling operation of said display screen and speaker means in response to an introduced code, to thereby enable a potential purchaser to compare products or services and determine which of a potential product or service to purchase, said control means allocating a first portion of the messages on said tapes for presentation by said first tape unit and a second portion of the messages on said tapes for presentation by said second tape unit, and where the length of the tape containing the first portion of the messages on each tape is substantially equal to the length of the tape containing the second portion of the message on each tape, said control means also selecting an initial start location intermediate the first and last messages in the first portion and initially positioning said initial start location of the first portion of the first tape at said first reading member, such that the access time to select any message in the first portion of the messages is no greater than the amount of time for the first tape to move from the initial start location to the first or last message in that portion of the first tape, said control means further selecting an initial start location intermediate the first and last messages in the second portion and initally positioning said initial start location in the second portion of the second tape at said second reading member, such that the access time to select any message in the second portion of the messages is no greater than the amount of time for the second tape to move from the initial start location for the second portion of the first or last message in the second portion of the second tape, whereby a selection introduced into said system will cause said control means to enable movement of said tapes in either one direction or the other from the initial start location to the selected message.

48. The informational display system of claim 47 further characterized in that said system comprises a telephone receiver mounted in said housing and a handset operable with said receiver, and signal generating means on said housing for selecting and introducing a phone indicia corresponding to a particular location for which a message may be generated on said system.

49. The informational display system of claim 47 further characterized in that a grid having a plurality of lights is associated with said housing, each of said lights being associated with a particular geographical area and presenting locations where a selected product or service can be obtained, said lights being energizable in response to generation of an input code for an associated product or service, and an overlay which is at least partially transparent and containing a map of the geographical area may be disposed over said lights to locate a selected product or service location with respect to said grid.

50. The system of claim 47 further characterized in that the number of messages in the first portion of messages on the first tape is approximately equal to the number of messages in the second portion of said messages on the second tape.

51. The system of claim 50 further characterized in that said control means monitors the number of times certain of the messages have been presented and thereafter reassigns the groups of messages to be presented by each tape unit to reduce tape wear.

52. The system of claim 51 further characterized in that said system comprises at least three video tape units and each tape unit presents no more than about one-third of the messages on each tape.

53. The system of claim 52 further characterized in that said control means causes each of said tapes to be read to insure that the messages on each such tape are substantially the same.

54. A system for presenting information pre-recorded on video tape medium, said system comprising:
(a) a plurality of cooperating tape units for presenting messages including at least a first video tape unit and a second video tape unit,
(b) an individual tape on each one of the tape units including at least a first video tape for presenting messages on said first tape unit and having a plurality of different informational messages pre-recorded thereon, and a second video tape for presenting messages on said second video tape unit and having a plurality of informational messages pre-recorded thereon and where each of the messages on each on tape are substantially identical to corresponding ones of the messages on each of the other other tapes,
(c) a video display control means operatively connected to said tape units to present the messages on said tapes,
(d) electronic control means operatively connected to each of said tape units and controlling operation of same,
(e) selection means operatively connected to said control means and being operable to select any one of a plurality of messages pre-recorded on each of said tapes, said control means being operable to effectively divide the number of messages on each of said tapes into a plurality of groups of messages and where the number of messages in any one group is substantially similar to the number of messages in each other group on each of said tapes, said control means assigning each of said tape units to present only one group of messages on the tape associated with that unit and the number of messages in each group being about equal to the total number of messages on any one message containing tape divided by the total number of messages containing tapes in the system, whereby all of said tape units in combination will present on the display member all of the messages on said message containing tapes, said electronic control means also monitoring the number of times certain of the messages have been presented and thereafter reassigning the groups of messages to be presented by each tape unit to reduce tape wear, said control means further causing each of said tapes to be read to insure that the messages on each such message containing tape are substantially the same.

55. The system of claim 54 further characterized in that said system comprises at least three tape units and each tape unit presents normally no more than about one-third of the messages on such tape.

56. A system for locating and presenting any of a plurality of pre-recorded messages on video tape medium in a relatively short time period without the necessity of moving a tape for a distance in excess of half the length of the tape, said system comprising:
(a) a first video tape unit capable of receiving a first video tape containing a plurality of messages,
(b) a second video tape unit capable of receiving a second video tape containing the same plurality of messages and each of such messages on said second tape are substantially identical to corresponding messages on said first tape,
(c) a first message reading member on said first tape unit for reading messages on said first tape,
(d) a second message reading member on said second tape unit for reading messages on said second tape,
(e) selection means for selecting any of said messages on said first and second tapes, and
(f) control means operatively connected to said first tape unit and to said second tape unit and to said selection means, said control means being operable to effectively divide the number of messages on each tape into a plurality of groups of messages and where the number of messages in any one group is substantially similar to the number of messages in each other group on each of said tapes, said control means assigning each of said tape units to present one group of messages on the tape associated with that tape unit with each tape unit being assigned a different group of messages so that each group of messages is assigned to one of the tape units, whereby all of said tape units in combination will present on the presentation means all of the messages on said tapes, said control means also allocating a first portion of the messages on said tapes for presentation by said first tape unit and a second portion of the messages on said tapes for presentation by said second tape unit, and where the length of the tape containing the first portion of the messages of each tape is substantially equal to the length of the tape containing the second portion of the messages on each tape, said control means also selecting an initial start location intermediate the first and last messages in the first portion and initially positioning said initial start location of the first portion of the first tape at said first reading member, such that the access time to select any message in the first portion of the messages is no greater than the amount of time for the first tape to move from the initial start location to the first or last message in that portion of the first tape, said control means further selecting an initial start location intermediate the first and last messages in the second portion and initially positioning said initial start location in the second portion of the second tape at said second reading member, such that the access time to select any message in the second portion of the tape is no greater than the amount of time for the second tape to move from the initial start location for the second portion to the first or last message in the second portion of the second tape, whereby a selection introduced into said system will cause said control means to enable movement of said tapes in either one direction or the other from the initial start location to the selected message.

57. An informational display system for use in a commercial establishment for providing promotional information regarding consumer products or consumer services to enable a potential purchaser to compare products or services and to determine which of the available products or services to purchase, said system comprising:
(a) an outer housing,
(b) a plurality of manually operable push-button switches on said housing so that said switches can be operated in predetermined combinations to introduce an input code relating to individual ones of said products or services,
(c) a video display screen on said housing,
(d) speaker means on said housing,
(e) a plurality of cooperating video tape units operatively connected to said controller with each receiving a video tape containing informational messages about said consumer products or consumer services so that the controller can select the proper informational messages on the video tapes corresponding to the introduced code and cause the messages to be displayed on the video screen and presented simultaneously on the speaker means, to thereby enable a potential purchaser to compare products or services and determine which of a potential product or service to purchase, and where the same messages can be presented from each video tape, said plurality of tape units comprising:
  (1) a first video tape unit capable of receiving a first video tape containing a plurality of messages,
  (2) a second video tape unit capable of receiving a second video tape containing the same plurality of messages and each of such messages on said second tape are substantially identical to corresponding messages on said first tape,
  (3) a first message reading member on said first tape unit for reading messages on said first tape, and
  (4) a second message reading member on said second tape unit for reading messages on said second tape,
(f) selection means for selecting any of said messages on said first and second tapes,
(g) a controller operatively connected to said plurality of switches and said display screen and speaker means and tape units for controlling operation of said display screen and speaker means in response to an introduced code, said controller being operable to effectively divide the number of messages on each tape into a plurality of groups of messages and where the number of messages in any one group is substantially similar to the number of messages in each other group on each of said tapes, said controller assigning each of said tape units to present only one group of messages on the tape associated with that tape unit with each tape unit being assigned a different group of messages so that each group of messages is assigned to one of the tape units, whereby all of said tape units in combination will present on the presentation means all of the messages on said tapes, said controller allocating a first portion of the messages on said tapes for presentation by a first of the tape units and a second portion of the messages on said tapes for presentation by a second of the tape units, and where the length of the tape containing the first portion of the messages of each tape is substantially equal to the length of the tape containing the second portion of the messages on each tape, said controller also selecting an initial start location intermediate the first and last messages in the first portion and initially positioning said initial start location of the first portion of the first tape at a first reading member, such that the access time to select any message in the first portion of the messages is no greater than the amount of time for the first tape to move from the initial start location to the first or last message in that portion of the first tape, said control means further selecting an initial start location intermediate the first and last messages in the second portion and initially positioning said initial start location in the second portion of the second tape at said second reading member, such that the access time to select any messages in the second portion of the tape is no greater than the amount of time for the second tape to move from the initial start location for the second portion to the first or last message in the second portion of the second tape, whereby a selection introduced into said system will cause said control means to enable movement of said tapes in either one direction or the other from the initial start location to the selected message, (g) a telephone receiver mounted in said housing and a handset operable with said receiver, (h) signal generating means on said housing for selecting and introducing a telephone indicia corresponding to a particular location for which a message may be generated on said system, (i) a grid having a plurality of intersecting lines representing geographical locations for certain consumer products or consumer services, (j) a plurality of lights associated with said housing, each of said lights being associated with a particular area and being energizable in response to generation of an input code for a selected product or service, (k) an overlay containing a map of the area in which the consumer products and services are available to the user of the system, and which is at least partially transparent for disposition over said lights to locate a selected product or service location with respect to said grid, and (l) a timing circuit operatively connected to said controller for controlling the time of operation of various functions performed by said system.

* * * * *